United States Patent [19]

Klöker et al.

[11] Patent Number: 4,524,177

[45] Date of Patent: Jun. 18, 1985

[54] USE OF 1,4-DIHYDROXYNAPHTHALENE IN THE HARDENING OF ETHYLENICALLY UNSATURATED COMPOUNDS

[75] Inventors: Werner Klöker; Klaus Kraft, both of Krefeld, Fed. Rep. of Germany

[73] Assignee: Bayer Aktiengesellschaft, Leverkusen, Fed. Rep. of Germany

[21] Appl. No.: 554,569

[22] Filed: Nov. 23, 1983

[30] Foreign Application Priority Data

Dec. 3, 1982 [DE] Fed. Rep. of Germany ....... 3244814

[51] Int. Cl.³ ............................................. C08L 67/06
[52] U.S. Cl. ...................................... 525/14; 525/23; 525/25; 525/27; 525/28; 525/36; 525/40; 525/127; 525/132; 525/150; 525/379
[58] Field of Search ............... 525/132, 379, 150, 127, 525/36, 27, 40, 28, 14, 23, 25

[56] References Cited

U.S. PATENT DOCUMENTS 2,857,303 10/1958 Wilson .................................. 525/40
3,845,162 10/1974 Hess et al. ............................ 525/40

Primary Examiner—Paul R. Michl
Assistant Examiner—J. M. Reddick
Attorney, Agent, or Firm—Connolly and Hutz

[57] ABSTRACT

1,4-Dihydroxynaphthalene, iron compounds and optionally tertiary arylamines prove to be a highly active accelerator/stabilizer system for peroxide-catalyzed ethylenically unsaturated hardenable compounds.

9 Claims, No Drawings

USE OF 1,4-DIHYDROXYNAPHTHALENE IN THE HARDENING OF ETHYLENICALLY UNSATURATED COMPOUNDS

This invention relates to the use of 1,4-dihydroxynaphthalene for the polymerisation of ethylenically unsaturated compounds in the presence of at least one polymerisation catalyst, one iron compound and optionally one amine accelerator.

Unsaturated polyester resins may be used inter alia as binders for cements, mortars, plugging compositions, fillers, casting resins, coating agents and optionally fibre-reinforced mouldings. It is known that unsaturated polyester resins can be hardened at room temperature ("cold") in the presence of peroxide catalysts using tertiary arylamines as a polymerisation accelerator (U.S. Pat. No. 2,480,828). Unsaturated polyester resins to be used for the "cold hardening" are often produced in an already "pre-accelerated" form, i.e. they already contain acclerator and are ony mixed with the polymerisation catalyst immediately before processing. Such "cold-hardenable" binders are said to have properties which are difficult to combine, namely a high or very high reactivity as well as a good storage stability.

It is known that iron compounds, for example iron pentacarbonyl, iron(III)chloride and ferrocene are capable of activating peroxides and they accelerate the hardening of amine-free as well as amine-containing peroxide-catalysed unsaturated polyester resins (DE-PS No. 959,589, U.S. Pat. Nos. 2,467,526; 2,467,527, GB-PS No. 596,190; Fette, Seifen Anstrichmittel 59, 166 (1957); European Patent Application No. 0,038,924; H. Hagen, Glasfaserverstärkte Kunststoffe, 2nd Edition, Springer Verlag, Berlin 1961, P. 110/111).

Surprisingly, we have found that iron compounds, combined with 1,4-dihydroxynaphthalene and optionally with tertiary arylamines, preferably tertiary monoarylamines, produce an accelerator/stabilizer system, the use of which in peroxide-catalysed ethylenically unsaturated polymerisable compounds, preferably acrylic resins and unsaturated polyester resins, produces an unexpectedly high acceleration of the hardening, so that very short gelling times are made possible (of the order of from 15 seconds to 3 minutes), whereas the use thereof in similar, but peroxide-free resins nevertheless results in a high storage stability.

Therefore, this invention relates to the use of
(a) from 0.02 to 1% by weight, preferably from 0.1 to 0.5% by weight, of 1,4-dihydroxynaphthalene,
(b) from 0.0015 to 0.15% by weight (calculated as metal), preferably from 0.003 to 0.07% by weight, of at least one iron compound,
(c) optionally from 0.05 to 6% by weight, preferably from 0.1 to 4% by weight, of at least one tertiary arylamine, and
(d) from 0.25 to 7% by weight, preferably from 1 to 3% by weight, of at least one polymerisation catalyst for the polymerisation of ethylenically unsaturated polymerisable compounds, the percentages of components (a), (b), (c) and (d) being based on the compounds to be polymerised.

Preferred iron compounds (b) are those which are soluble in the compounds to be polymerised and which, once dissolved (optionally at elevated temperature), remain in solution at room temperature. Examples of such soluble iron compounds include the following:

iron salts, preferably iron(III)salts of saturated and/or unsaturated monocarboxylic acids having from 1 to 32 carbon atoms, preferably from 2 to 18 carbon atoms, or of saturated and/or unsaturated dicarboxylic acids having from 2 to 30 carbon atoms, for example iron(III)naphthenate or iron(III)octoate, iron salts of monofunctional dicarboxylic acid derivatives, in particular of the above-mentioned dicarboxylic acids, for example iron salts of dicarboxylic acid semiesters, -semiamides or -seminitriles, iron compounds of keto acids, ketoesters, di- and oligoketones, in particular enolizable compounds, for example iron acetyl acetonate, charge-transfer complexes with iron as the central atom, for example ferrocene, and carbonyls with iron as the central atom, for example iron pentacarbonyl.

Preferred tertiary arylamines (c) include N,N-bis-($C_1$–$C_6$-alkyl)-arylamines, N,N-bis-($\beta$-hydroxy-$C_2$–$C_3$-alkyl)-arylamines (DE-PS No. 919,531), N-aryl-substituted dialkanolamine polyurethanes obtainable from N,N-bis($\beta$-hydroxy-$C_2$–$C_3$-alkyl)-arylamines, a diisocyanate and a monofunctional compound (mono-isocyanate, mono-alcohol, monothioalcohol, primary or secondary amine) (DE-PS No. 1,643,972) and polyester amines obtainable from N,N-bis-($\beta$-hydroxy-$C_2$–$C_3$ alkyl) arylamines and dicarboxylic acids (DE-PS No. 1,943,954).

In this context, "aryl" means phenyl which may be substituted by from 1 to 3 $C_1$–$C_6$ alkyl groups.

One particular class of tertiary arylamines (c) is represented by compounds corresponding to the formula (I):

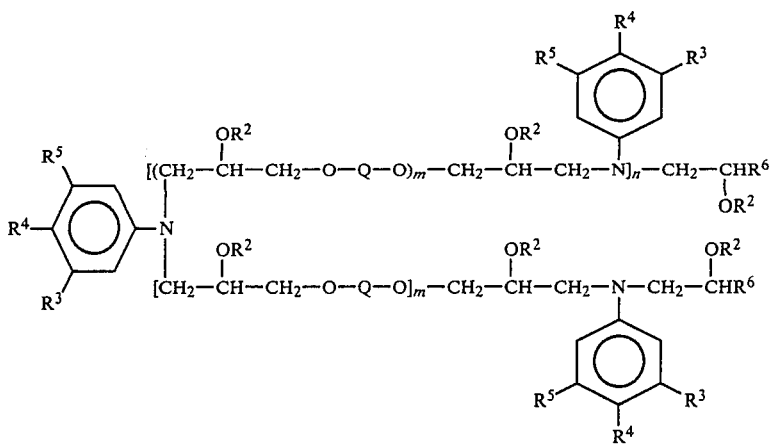 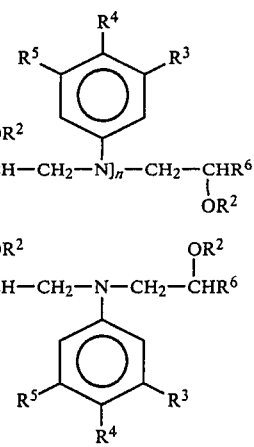 (I)

wherein
Q represents

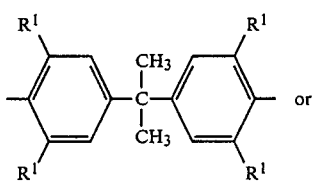 or

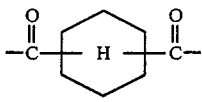

$R^1$ represents hydrogen or methyl, $R^2$ represents N-$C_1$-$C_{18}$ alkylcarbamoyl, N-$C_6$-$C_{12}$ arylcarbamoyl, the radical, excluding the hydroxyl group, of an optionally chlorine- or $C_1$-$C_4$-alkyl-substituted aliphatic saturated or mono- to triunsaturated, of a cycloaliphatic, araliphatic, heterocyclic or aromatic carboxylic acid having up to 21 carbon atoms, or hydrogen, $R^3$ to $R^5$ represent hydrogen, $C_1$-$C_{18}$ alkyl, $C_5$-$C_8$ cycloalkyl, $C_5$-$C_8$ cycloalkyl, $C_5$-$C_{14}$ aryl, fluorine, chlorine, bromine or iodine, $R^6$ represents hydrogen, methyl, $C_6$-$C_{12}$ aryl, hydroxymethyl, chloromethyl, $C_1$-$C_6$ alkoxymethyl, $C_6$-$C_{12}$ aryloxymethyl or $C_2$-$C_6$ acyloxymethyl, m represents a number from 1 to 3,
n represents zero or a number from 1 to 3,
m+n represents a number from 1 to 5
provided that at least one of the radicals $R^3$, $R^4$ and $R^5$ represents an alkyl radical, if another (of the radicals $R^3$, $R^4$, $R^5$) represents a halogen radical.

Such tertiary arylamines (c) may be produced, for example, by reacting in a first stage an aniline corresponding to the formula (II)

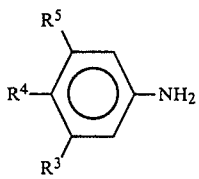 (II)

with a diepoxide corresponding to the formula (III):

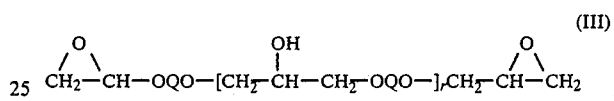 (III)

wherein R=m−1, in quantities such that the molar ratio of (II):(III) is from 1.25 to 2, at a temperature of from 100° to 250° C., allowing the resulting reaction product to react at a temperature of from 90° to 180° C. with an oxirane corresponding to the formula (IV):

 (IV)

or at a temperature of from 160° to 250° C. with an alkylene carbonate corresponding to the formula (V):

 (V)

in quantitative ratios such that, after the reaction, at least 90% of all the amine nitrogen atoms are bound in a tertiary manner, and optionally then partly or completely urethanising or esterifying the free hydroxyl groups of the product thus obtained ($R^2$=H) with an isocyanate corresponding to the formula (VI):

 (VI)

at a temperature of from 20° to 120° C., or with a monocarboxylic acid corresponding to the formula (VII):

 (VII)

or with an esterifiable derivative thereof at a temperature of from 150° to 250° C.

Preferred polymerisation catalysts (d) include diacyl peroxides, for example diacetyl peroxide, dibenzoyl peroxide, di-p-chlorobenzoyl peroxide, phthaloyl peroxide, succinyl peroxide, dilauroyl peroxide, acetylcyclohexanesulphonyl peroxide and percarbonates, for example cyclohexyl percarbonate, and bis-(4-tert.-butylcyclohexyl) percarbonate.

Preferred ethylenically unsaturated compounds to be polymerised are acrylic resins and unsaturated polyester resins.

Within the present context, "acrylic resins" are (meth)acryloyloxy group-containing polyesters, polyurethanes, polyepoxides, polyols, polyetherpolyols, as described, for example, in DE-OS Nos. 2,053,683; 2,261,612; 2,423,354; 2,838,691 (polyester(meth)acryltes), in DE-OS Nos. 1,447,929; 1,916,499; 2,115,373; in U.S. Pat. No. 2,958,704; 3,297,745, in GB-PS No. 743,514 (urethane(meth)acrylates), in DE-OS Nos. 1,921,869, 2,349,979, 2,411,760; 2,429,527; in GB-PS No. 1,006,587, in U.S. Pat. Nos. 3,066,112; 3,804,735 (epoxy(meth)acrylates), in DE-OS Nos. 1,770,825, in U.S. Pat. Nos. 2,101,107; 2,413,973; 3,368,900; 3,552,986; 3,558,387 (polyol(meth)acrylates), in DE-OS Nos. 2,651,507; 2,853,921 and in U.S. Pat. Nos. 2,951,758, 3,380,831 (polyetherpolyol(meth)acrylates).

In order to reduce the viscosity, to increase the reactivity or to achieve specific properties, the above-mentioned "acrylic resins" may also be mixed with copolymerisable olefinically unsaturated monomers, for example with (meth)acrylates of monohydric alcohols, hydroxyalkyl(meth)acrylates, (meth)acrylamides, styrene, α-methylstyrene, styrenes nuclear-substituted by alkyl groups, divinylbenzene, (meth)acrylonitrile, vinyl chloride, vinylidene chloride, vinyl ethers, vinyl acetate or mixtures thereof. Of course, it is also possible to polymerise at least one α,β-mono-olefinically unsaturated monomer, for example of the type mentioned above, in the presence of the stabilizer/accelerator systems according to the present invention.

Within the present context, "unsaturated polyester resins" are mixtures of from 20 to 80 parts by weight of α,β-ethylenically unsaturated polyesters and from 80 to 20 parts by weight of unsaturated monomers which may be copolymerised therewith.

Such α,β-ethylenically unsaturated polyesters are the conventional polycondensation products of at least one α,β-ethylenically unsaturated dicarboxylic acid usually having 4 or 5 carbon atoms or ester-forming derivatives thereof, optionally in admixture with up to 400 mol %, based on the unsaturated acid components, of at least one aliphatic saturated dicarboxylic acid having from 4 to 10 carbon atoms, or a cycloaliphatic, araliphatic or aromatic dicarboxylic acid having from 8 to 10 carbon atoms or ester-forming derivatives thereof, with at least one polyhydroxy compound, in particular dihydroxy compound, having from 2 to 8 carbon atoms; also polyesters, as described, for example by J. R. Lawrence, in "Polyester Resins", Reinhold Publ. Corp., New York 1960, P 18 et seq., and in Kunststoff-Handbuch, Vol. VIII ("Polyester") Carl Hanser Verlag, Munich 1973, P. 247–312.

The acid numbers of the polyesters should range from 1 to 100, preferably from 10 to 50, the OH numbers should range from 10 to 150, preferably from 20 to 100, and the molecular weights $\overline{M}_n$; measured as a number average, should be from about 300 to 10,000, preferably from about 1,000 to 3,000 (measured by vapour pressure osmometry in dioxane and acetone. If the values differ, the lower value is considered to be correct).

The most preferred copolymerisable monomer is styrene. Other preferred copolymerisable monomers are stated above under the definition of the "acrylic resins".

The ethylenically unsaturated compounds to be polymerised may be subjected to a "basic stabilization", for example using optionally nuclear-alkylated diphenols, ethers thereof, benzoquinone and nuclear-alkylated and nuclear-halogenated derivatives thereof, such as tetrachlorobenzoquinone, di-tert-butylquinone, tert-butylhydroqunione, trimethylhydroquinone, hydroquinone, sulphinyldiphenol and/or copper compounds, such as copper naphthenate, copper octoate, copper(I) complexes of neutral phosphorus acid esters, in quantities of from 0.0005 to 0.2%, by weight, preferably from 0.001 to 0.05% by weight, based on ethylenically unsaturated compound to be polymerised.

1,2- and 2,6-Dihydroxynaphthalene may also be simultaneously used as stabilizers. During the use of a certain concentration of 2,6-dihydroxynaphthalene, there appears, after the peroxide has been added, a green colouring (indication of peroxides) which may optionally disappear again during hardening.

The compounds to be polymerised may, of course, contain fillers, reinforcing agents and/or flameproofing agents.

The polymerisable compounds provided with the stabilizer-accelerator systems to be used according to the present invention may be employed in the construction and electronics industries, in boat building and in shipbuilding as well as in the automobile industry. Extremely reactive systems are important for fixing workpieces and construction parts during assembly.

The percentages used in the following Examples relate to the weight. Parts are parts by weight.

EXAMPLES

Production or constitution of the components

Unsaturated polyester resin I (UP I)

Maleic acid anhydride, phthalic acid anhydride, propanediol-1,2 and diethylene glycol in a molar ratio, of 0.8:0.2:0.532:0.668 were polycondensed in the melt until an acid number of 7.6 was attained. 100 parts of the polyester thus obtained were stabilized with 0.01 part of hydroquinone and diluted with styrene up to a solids content of 63.1%. The viscosity of the resin UP I thus obtained was 669 mPa.s at 20° C.

Unsaturated Polyester resin II (UP II)

The dicarboxylic acid anhydride and diols which were used for the production of UP I were polycondensed in the same molar ratio up to an acid number 6. 100 parts of the polyester thus obtained were stabilized with 0.01 part of hydroquinone and with 0.002 parts of coppper naphthenate, and diluted with styrene to a solids content of 66.9%. Viscosity: 1180 mPa.s (20° C.).

Unsaturated polyester resin III (UP III)

94 parts of UP II were diluted with 6 parts of styrene and pre-accelerated with 4 parts of acrylamine C (see below).

Epoxyacrylate

An epoxyacrylate, produced from 60.95 parts of bisphenol A diepoxide (epoxide equivalent 190) and 23.61 parts of acrylic acid in the presence of 0.42 parts of thiodiglycol as catalyst, was mixed with 15 parts of triethoxytrimethylol propane trisacrylate and stabilized with 0.42 parts of p-methoxyphenol. Viscosity: about 170 000 mPa.s (20° C.).

Arylamine A

10% solution of N,N-dimethyl-p-toluidine in styrene.

Arylamine B

N,N-bis-(β-hydroxyethyl)-p-toluidine.

Arylamine C

Poly-[N,N-bis(β-hydroxypropyl)-p-toluidine-adipate], dissolved 70% in styrene, viscosity corresponding to an outflow time of 110 seconds (DIN 53 211, DIN Cup 4).

Arylamine D

70% solution in styrene of a reaction product obtained by the reaction of 1 mol of bisphenol A diglycidyl ether with 2 mols of (3,4-)xylidine and by the subsequent addition of 2 moles of ethylene oxide.

1,4-, 1,2- and 2,6-Dihydroxynaphthalene (DHN) were dissolved in each case in a mixture of styrene and ethylene glycol monoethylether (1:1 parts by weight). The concentration is stated in the individual Examples.

Copper naphthenate was used in the form of a 1% solution (0.1% of Cu-metal content) in styrene.

Iron octoate was used as a 56% solution in white spirit (iron content 7 to 8%).

Benzoyl peroxide was used as a standard paste (plasticizer portion 50%).

Sulphinyl diphenol was used in the form of a solution thereof in styrene/ethylene glycol monoethylether (1:1 parts by weight).

Measurement methods

The hardening operations took place at room temperature (25° C.).

The gelling times were measured according to two different methods.

(a) dipping with a glass rod. The gelling time is attained ("by hand") as soon as the resin draws threads when the glass rod is removed.

(b) according to DIN 16 946, sheet 1, chapter 6.2.2 (the time until a temperature of 35° C. is reached).

The times up to the attainment of the maximum temperature are considered the hardening times, also analogously to DIN 61 946, sheet 1, chapter 6.2.2.

The temperature was determined using an iron/constantan-thermoelement or using a resistance thermometer.

The storage stability was determined in a heating chamber in 50 ml glass bottles (of course, without benzoyl peroxide).

TABLE 1

Formulation: 100 parts of UP I,
1% solution of 1,4-dihydroxynaphthalene (1,4-DHN),
0.2 parts of copper naphthenate solution,
0.1 part of iron octoate solution,
Arylamine C, and
2 parts of benzoyl peroxide paste.

| Example | 1.1 | 1.2 | 1.3 | 1.4 | 1.5 |
|---|---|---|---|---|---|
| Parts of 1,4-DHN-solution | — | 1 | 1.6 | 3 | 4 |
| Parts of Arylamine C | 4 | — | 4 | 4 | 4 |
| Gelling time by hand (sec) | | | ~24 | ~24 | ~24 |
| Gelling time acc. to DIN (min) | 1.3 | 0.65 | | | |
| Hardening time (min.) | 2.6 | 3.3 | not measured | | |
| Maximum temperature (°C.) | 147 | 55 | | | |
| Storability | | | | | |
| at 80° C. (hours) | 1.5 | 39 | 10 | 15 | 16 |
| at 50° C. (days) | 4 | 50 | 14 | 22 | 34 |

TABLE 2

Formulation: 94 parts of UP II,
6 parts of styrene,
10% solution of 1,4-DHN,
0.1 part of iron octoate solution,
Benzoyl peroxide paste,
no arylamine.

| Examples | 2.1 | 2.2 |
|---|---|---|
| Parts of 1,4-DHN solution | 1.6 | 1.6 |
| Parts of benzoyl peroxide paste | — | 2 |
| Gelling time by hand (sec) | | 15–18 |
| Gelling time acc. to DIN (min) | | 0.9 |
| Hardening time (min.) | | 3.4 |
| Maximum temperature (°C.) | | 53 |

TABLE 3

Formulation: 100 parts of UP II,
10% solution of 1,4-DHN
0.1 part of iron octoate solution,
arylamine A, B or D, and
2 parts of benzoyl peroxide paste.

| Examples | 3.1 | 3.2 | 3.3 |
|---|---|---|---|
| Parts of 1,4-DHN-solution | 1.6 | 1.6 | 1.6 |
| Parts/type of arylamine(*) | 2.703 A | 0.4 B | 1.124 D |
| Gelling time by hand (sec) | 18 | 18 | 17 |
| Gelling time acc. to DIN.(min) | 1.1 | 1.1 | 1.15 |
| Hardening time (min.) | 4.3 | 4.3 | 4.0 |
| Maximum temperature (°C.) | 125 | 136 | 134 |

(*)The different quantities correspond to the same content of amine-nitrogen

TABLE 4

Formulation: 100 parts of UP III,
10% solution of 1,4-DHN,
Iron octoate solution,
10% solution of iron acetylacetonate in styrene, and
2 parts of benzoyl peroxide paste.

| Examples | 4.1 | 4.2 |
|---|---|---|
| Parts of 1,4-DHN-solution | 1.6 | 1.6 |
| Parts of iron octoate solution | 0.1 | — |
| Parts of iron acetylacetonate solution | — | 0.5 |
| Gelling time by hand (sec) | 18 | 16 |
| Gelling time acc. to DIN (min) | 1.0 | 0.9 |
| Hardening time (min.) | 4.2 | 4.2 |
| Maximum temperature (°C.) | 116 | 115 |
| Storability | | |
| at 80° C. (hours) | 94 | 94 |
| at 50° C. (days) | 90 | 90 |

TABLE 5

Formulation: 100 parts of UP I,
10% solution of 1,4-DHN,
Iron octoate solution,
0.2 parts of copper naphthenate solution,
4 parts of arylamine C,
Tetrachlorobenzoquinone, 1% solution in styrene,
1% solution of hydroquinone in styrene/ethylene glycol monoethylether
(1:1) parts by weight,
1% solution of sulphinyldiphenol, and
2 parts of benzoyl peroxide paste.

| Examples | 5.1 | 5.2 | 5.3 | 5.4 | 5.5 | 5.6 |
|---|---|---|---|---|---|---|
| Parts of 1,4-DHN-solution | 0.3 | 0.4 | 1 | 1 | 1.5 | 2 |
| Parts of iron octoate solution | 0.1 | 0.1 | 0.1 | 0.1 | 0.05 | 0.05 |
| Parts of tetrachlorobenzoquinone | — | 3 | — | 3 | 3 | 3 |
| Parts of hydroquinone solution | — | — | — | — | — | 1 |
| Parts of sulphinyldiphenol solution | — | — | 2.34 | — | — | — |
| Gelling time by hand (sec) | 24 | 60 | 22 | 31 | 45 | 67 |
| Gelling time acc. to DIN (min) | not measured | 3.6 | 0.7 | 2.8 | 3.5 | 6.2 |
| Hardening time (min) | | 5.1 | 3.4 | 5.4 | 6.5 | 10.7 |
| Maximum temperature (°C.) | | 144 | 136 | 138 | 132 | 118 |
| Storability | | | | | | |
| at 80° C. (hours) | 15 | 72 | 77–140 | 88 | 72–136 | 72–136 |
| at 50° C. (days) | 22 | 105 | 118–135 | 115 | 128 | 139 |

TABLE 6

Formulation: 100 parts of UP II,
6 parts of styrene,
1 part of 10% 1,4-DHN solution,
10% solution of 1,2 or 2,6-DHN,
4 parts of arylamine C,
0.1 part of iron octoate solution,
1% sulphinyldiphenol solution, and
2 parts of benzoyl peroxide paste.

| Examples | 6.1 | 6.2 | 6.3 | 6.4 | 6.5 | 6.6 | 6.7 | 6.8 |
|---|---|---|---|---|---|---|---|---|
| Parts of 1,2-DHN solution | — | 0.3 | 0.8 | 1.6 | — | — | — | — |
| Parts of 2,6-DHN solution | — | — | — | — | 0.3 | 0.8 | 1.6 | — |
| Parts of sulphinyldiphenol solution | — | — | — | — | — | — | — | 3 |
| Gelling time by hand (sec) | 12 | 15 | 17 | 19 | 17 | 14 | 15 | 17 |
| Gelling time acc. to DIN (min) | 0.9 | 1.3 | 6.0 | 35.6 | 0.9 | 0.85 | 0.9 | 1.65 |
| Hardening time (min) | 3.6 | 5.6 | 9.8 | 45.3 | 6.8 | 11.9 | 2.2 | 4.45 |
| Maximum temperature (°C.) | 129 | 124 | 116 | 69 | 125 | 106 | 38 | 125 |
| Colouring | — | — | — | — | — | * | green | — |

*turns green after addition of benzoylperoxide; colouring changes or disappears during hardening.

TABLE 7

Formulation: 100 parts of expoxyacrylate,
10% solution of 1,4-DHN,
0.1 part of iron octoate solution,
4 parts of arylamine C, and
2 parts of benzoyl peroxide paste

| Examples | 7.1 | 7.2 |
|---|---|---|
| Parts of 1,4-DHN solution | — | 1.6 |
| Gelling time by hand (min) | 8 | 1 |
| Gelling time acc. to DIN (min) | 14.2 | not measured |
| Hardening time (min) | 22 | |
| Maximum temperature (°C.) | 48 | |
| Storability | | |
| at 80° C. (hours) | 40 | about 400 |
| at 50° C. (days) | >100 | >100 |

We claim:

1. A process for the hardening of acrylic resins or unsaturated polyester resins comprising hardening the resin in the presence of:
   (i) from 0.02 to 1% by weight of 1,4-dihydroxynaphthalene,
   (ii) from 0.0015 to 0.15% by weight, calculated on the basis of the metal, of at least one iron compound soluble in the resins to be hardened, and
   (iii) from 0.25 to 7% by weight of at least one peroxide catalyst,
the percentage of (i), (ii) and (iii) being based on the resin to be hardened.

2. A process according to claim 1, in which the quantity of component (i) is from 0.1 to 0.5% by weight.

3. A process according to claim 1, in whcih the quantity of component (ii) is from 0.003 to 0.07% by weight.

4. A process according to claim 1, in which the quantity of component (iii) is from 1 to 3% by weight.

5. A process according to claim 1, in which hardening is effected in the addition presence of
   (iv) from 0.05 to 6% by weight of at least one tertiary arylamine.

6. A process according to claim 5, in which the quantity of arylamine is from 0.1 to 4% by weight.

7. A process according to claim 5, in which the arylamine is N,N-bis-($C_1$–$C_6$-alkyl)-arylamines, N,N-bis($\beta$-hydroxy-$C_2$–$C_3$-alkyl)-arylamines, N-aryl-substituted dialkanolamine polyurethanes obtainable from reacting N,N-bis-($\beta$-hydroxy-$C_2$–$C_3$-alkyl)-arylamines with a diisocyanate, or polyester amines obtainable from reacting N,N-bis-($\beta$-hydroxy-$C_2$–$C_3$-alkyl)-arylamines with dicarboxylic acids, wherein aryl is phenyl or phenyl substituted by 1 to 3 alkyls having 1 to 6 carbon atoms.

8. A process according to claim 1, in which component (ii) is iron(III)-naphthenate, iron(III)-octoate, iron(III)-acetylacetonate, or mixtures thereof.

9. A process according to claim 1, in which from 0.0005 to 0.2% by weight, based on the resins to be hardened, of sulphinyldiphenol is present as a stabilizer or as a costabilizer.